(12) United States Patent
Hars et al.

(10) Patent No.: US 7,360,057 B2
(45) Date of Patent: Apr. 15, 2008

(54) ENCRYPTION OF DATA IN A RANGE OF LOGICAL BLOCK ADDRESSES

(75) Inventors: Laszlo Hars, Cranberry Township, PA (US); Robert H. Thibadeau, Pittsburgh, PA (US)

(73) Assignee: Seagate Technology, LLC, Scotts Valley, CA (US)

( * ) Notice: Subject to any disclaimer, the term of this patent is extended or adjusted under 35 U.S.C. 154(b) by 347 days.

(21) Appl. No.: 11/086,178

(22) Filed: Mar. 22, 2005

(65) Prior Publication Data

US 2006/0218412 A1  Sep. 28, 2006

(51) Int. Cl.
*G06F 12/14* (2006.01)

(52) U.S. Cl. .................. 711/203; 713/189; 713/190; 713/193

(58) Field of Classification Search ................ 713/189, 713/190, 193; 711/203
See application file for complete search history.

(56) References Cited

U.S. PATENT DOCUMENTS

| 4,588,991 | A | * | 5/1986 | Atalla ........................ 713/165 |
| 5,333,277 | A | | 7/1994 | Searls ........................ 395/325 |
| 6,468,160 | B2 | | 10/2002 | Eliott ........................ 463/43 |
| 6,599,194 | B1 | | 7/2003 | Smith et al. ................. 463/30 |
| 6,712,704 | B2 | | 3/2004 | Eliott ........................ 463/43 |
| 2002/0077177 | A1 | | 6/2002 | Elliott ........................ 463/40 |
| 2003/0032486 | A1 | | 2/2003 | Elliott ........................ 463/43 |
| 2003/0190952 | A1 | | 10/2003 | Smith et al. ................. 463/30 |
| 2004/0199779 | A1 | * | 10/2004 | Huang ........................ 713/193 |
| 2006/0195704 | A1 | * | 8/2006 | Cochran et al. ............ 713/193 |

FOREIGN PATENT DOCUMENTS

| EP | 0 919 904 A2 | 6/1999 |
| WO | WO 02/47080 A2 | 6/2002 |

OTHER PUBLICATIONS

US 6,336,866, 01/2002, Eliott (withdrawn)

* cited by examiner

*Primary Examiner*—Jack Lane
(74) *Attorney, Agent, or Firm*—Westman, Champlin & Kelly, P.A.

(57) ABSTRACT

A method of encrypting information in a data storage device that includes a storage medium having a plurality of physical memory locations referenced through logical block addresses is provided. The method includes receiving, in the data storage device, data from a host computer. At least a portion of the received data is encrypted, within the data storage device, if the at least a portion of the received data is destined for storage in at least a subset of the plurality of physical memory locations, which correspond to a predetermined range of logical block addresses. The encryption of the at least a portion of the received data is substantially transparent to the host computer and independent of a file to which the at least a portion of the data belongs. In addition, a data storage device readable by a computer system for implementing the above encryption method is provided.

20 Claims, 6 Drawing Sheets

```
                            ┌─ 500
                            ▼

┌─────────────────────────────────────┐
    │  DATA FROM A HOST COMPUTER IS       │── 502
    │  RECEIVED IN A DATA STORAGE DEVICE  │
    └─────────────────────────────────────┘
                     │
                     │
                     │                              ── 504
    ┌─────────────────────────────────────┐
    │  AT LEAST A PORTION OF THE RECEIVED │
    │  DATA IS ENCRYPTED WITHIN THE DATA  │
    │  STORAGE DEVICE IF THE AT LEAST A   │
    │  PORTION OF THE RECEIVED DATA IS    │
    │  DESTINED FOR STORAGE IN A SUBSET OF│
    │  A PLURALITY OF PHYSICAL MEMORY     │
    │  LOCATIONS, WHICH CORRESPOND TO A   │
    │  PREDETERMINED RANGE OF LOGICAL     │
    │  BLOCK ADDRESSES                    │
    └─────────────────────────────────────┘
```

ENCRYPTION OF DATA IN A RANGE OF LOGICAL BLOCK ADDRESSES

FIELD OF THE INVENTION

The present invention relates generally to data storage devices. More particularly, the present invention relates to the encryption of data for storage in physical memory locations, which correspond to a range of logical block addresses (LBAs), in a data storage device.

BACKGROUND OF THE INVENTION

Mass storage devices are one of many components of modern computers. One type of mass storage device is a fixed disc drive. Such drives are used to store vast amounts of information relating to operating systems, applications, and user data. Some of this information is critical to the functioning of the host system in which the disc drive operates. In addition, the recent dramatic decrease in the cost of disc drives has resulted in them being used in many non-conventional applications, such as, audio/video applications, internet set-top boxes, gaming stations, etc. All these applications require special software to be pre-loaded onto a disc. If application software or other critical information is intentionally or unintentionally overwritten, significant losses could occur. Thus, these applications require sophisticated write protection security features. Further, schemes for prevention of unauthorized access of confidential user data are also required.

Currently, write protection schemes, and schemes for the prevention of unauthorized access of user data, are primarily implemented in the host computer, with the disc drive having little or no control over the operation of these schemes. Lack of control over such schemes within the disc drive is especially problematic in the case of protection of confidential data because, if the disc drive is stolen or removed from the original host computer, the confidential user data is no longer protected.

Embodiments of the present invention provide solutions to these and other problems, and offer other advantages over the prior art.

SUMMARY OF THE INVENTION

The present invention relates to a system for encryption of confidential user data that is implemented within a data storage device (such as a disc drive) and is substantially transparent to a host computer, thereby addressing the above-mentioned problem.

In accordance with one embodiment of the invention, a method of encrypting information in a data storage device that includes a storage medium having a plurality of physical memory locations referenced through logical block addresses is provided. The method includes receiving, in the data storage device, data from a host computer. At least a portion of the received data is encrypted, within the data storage device, if the at least a portion of the received data is destined for storage in at least a subset of the plurality of physical memory locations, which correspond to a predetermined range of logical block addresses. The encryption of the at least a portion of the received data is substantially transparent to the host computer and independent of a file to which the at least a portion of the data belongs.

The present invention can also be implemented as a data storage device which tangibly embodies a program of instructions executable by a controller of the data storage device to perform the above encryption method.

These and various other features as well as advantages, which characterize the present invention, will be apparent upon reading the following detailed description and review of the associated drawings.

DETAILED DESCRIPTION OF ILLUSTRATIVE EMBODIMENTS

Figure 1:
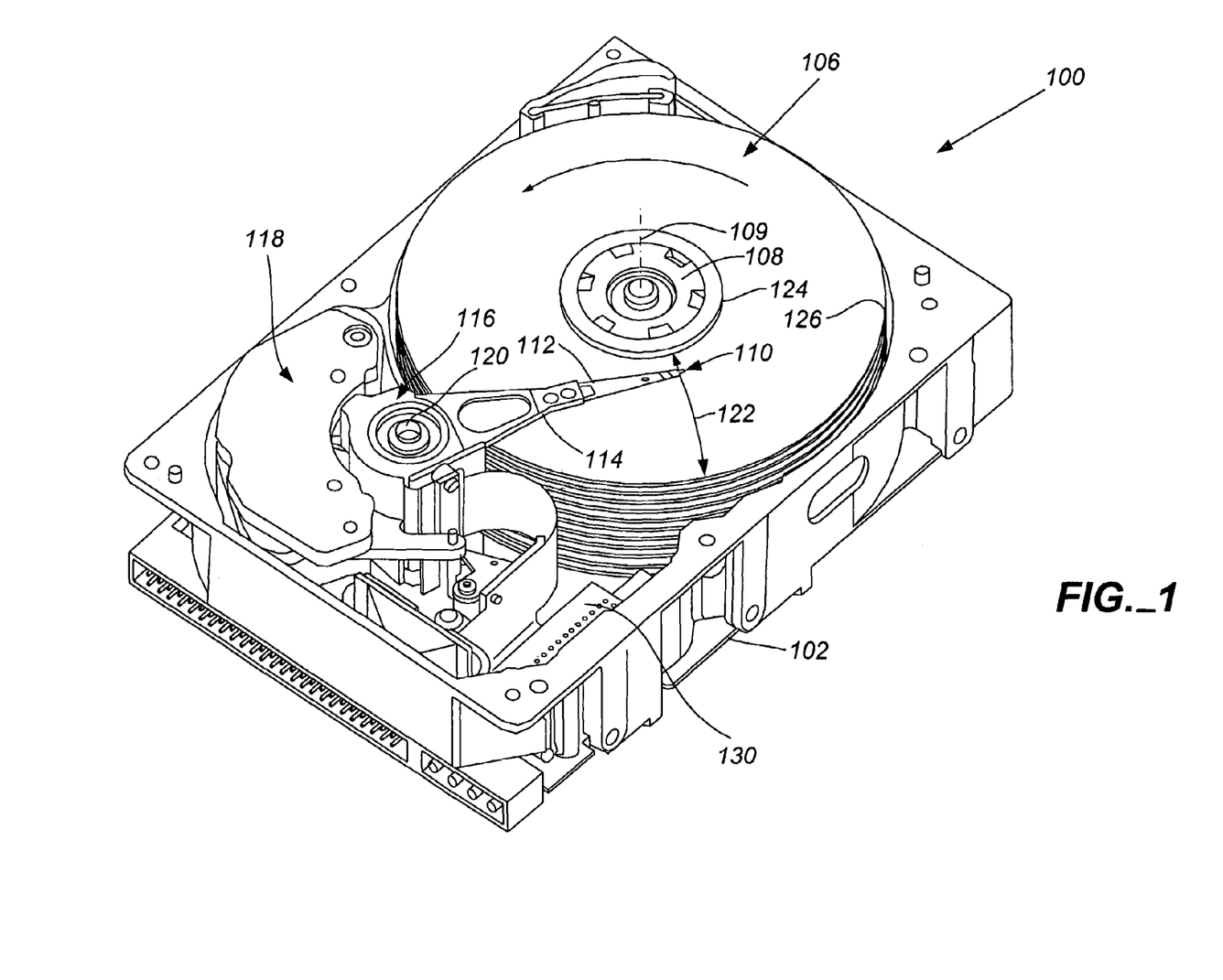
FIG. 1 is an isometric view of a disc drive in which embodiments of the present invention are useful.

Referring no to FIG. 1, an isometric view of a disc drive 100 in which embodiments of the present invention are useful is shown. The same reference numerals are used in the various figures to represent the same or similar elements. Disc drive 100 includes a housing with a base 102 and a top cover (not shown). Disc drive 100 further includes a disc pack 106, which is mounted on a spindle motor 132 (shown in FIG. 3) by a disc clamp 108. Disc pack 106 includes a plurality of individual discs, which are mounted for co-rotation about central axis 109. In some embodiments, instead of utilizing a disc pack, a single disc 106 is employed. Each disc surface has an associated disc head slider 110 which is mounted to disc drive 100 for communication with the disc surface. Surfaces of disc 106 are usually divided into zones, with each zone including multiple adjacent tracks. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics, which is included in control circuitry (or controller) 130, based on signals generated by heads 110 and a host computer 300 (shown in FIG. 3).

Figure 2:
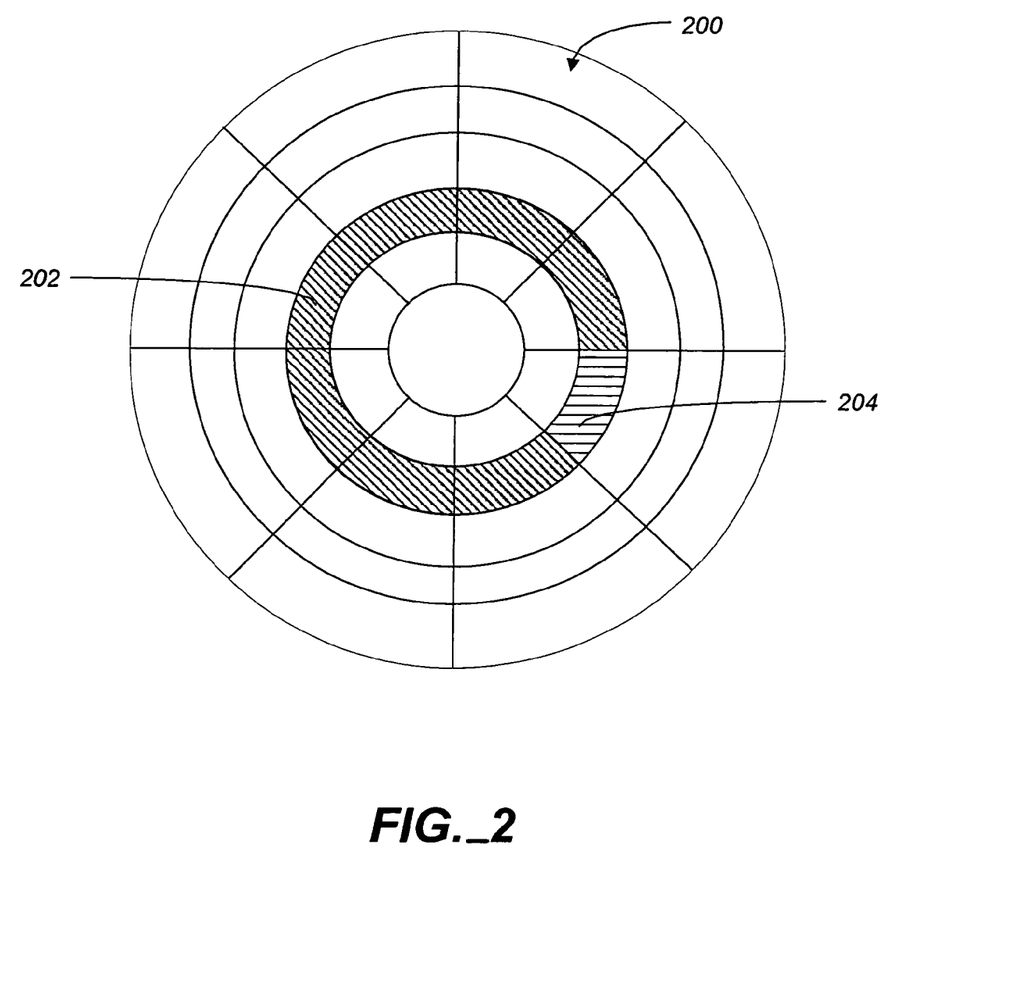
FIG. 2 is a diagrammatic view of a surface of a disc employed in the disc drive of FIG. 1.

Referring now to FIG. 2, a disc surface 200 of a typical disc (such as a disc of disc pack 106 of FIG. 1) is shown. Each disc surface includes a plurality of radially concentric tracks to aid in location and readback of data. Each track (such as 202) is further broken down into a plurality of sectors (or physical memory locations), which further aid in location of a particular unit of information. In FIG. 2, portion 204 represents a single sector. These sectors are addressed using a linear addressing scheme called logical block addressing (LBA). For example, in a 540 Meg drive, LBA 0 corresponds to sector 1 (the first sector) of head 0 (the first head), cylinder or track 0 (the first cylinder or track), and successively proceeds along to the last physical sector on the drive which would be LBA 1,065,456. As used herein, logical block addressing represents any linear addressing scheme.

As mentioned above, disc drive 100 is a component of a computer and is utilized to store vast amounts of information relating to operating systems, applications, and user data. As indicated earlier, current schemes for the prevention of unauthorized access of user data are primarily implemented in the host computer, with the disc drive having little or no control over the operation of these schemes.

The present invention is described below in connection with FIG. 3 which is a block diagram showing disc drive 100 of the present invention coupled to a host computer 300. In general, the present invention addresses earlier-mentioned problems with the prior art by providing a system for encryption of confidential user data that is implemented within disc drive 100 and is substantially transparent to host computer 300. For a better understanding of the data encryption system of the present invention, an environment in which disc drive 100 of the present invention is useful is first described below. Thereafter, details regarding data encryption within disc drive 100 in accordance with the present invention are provided.

Figure 3:
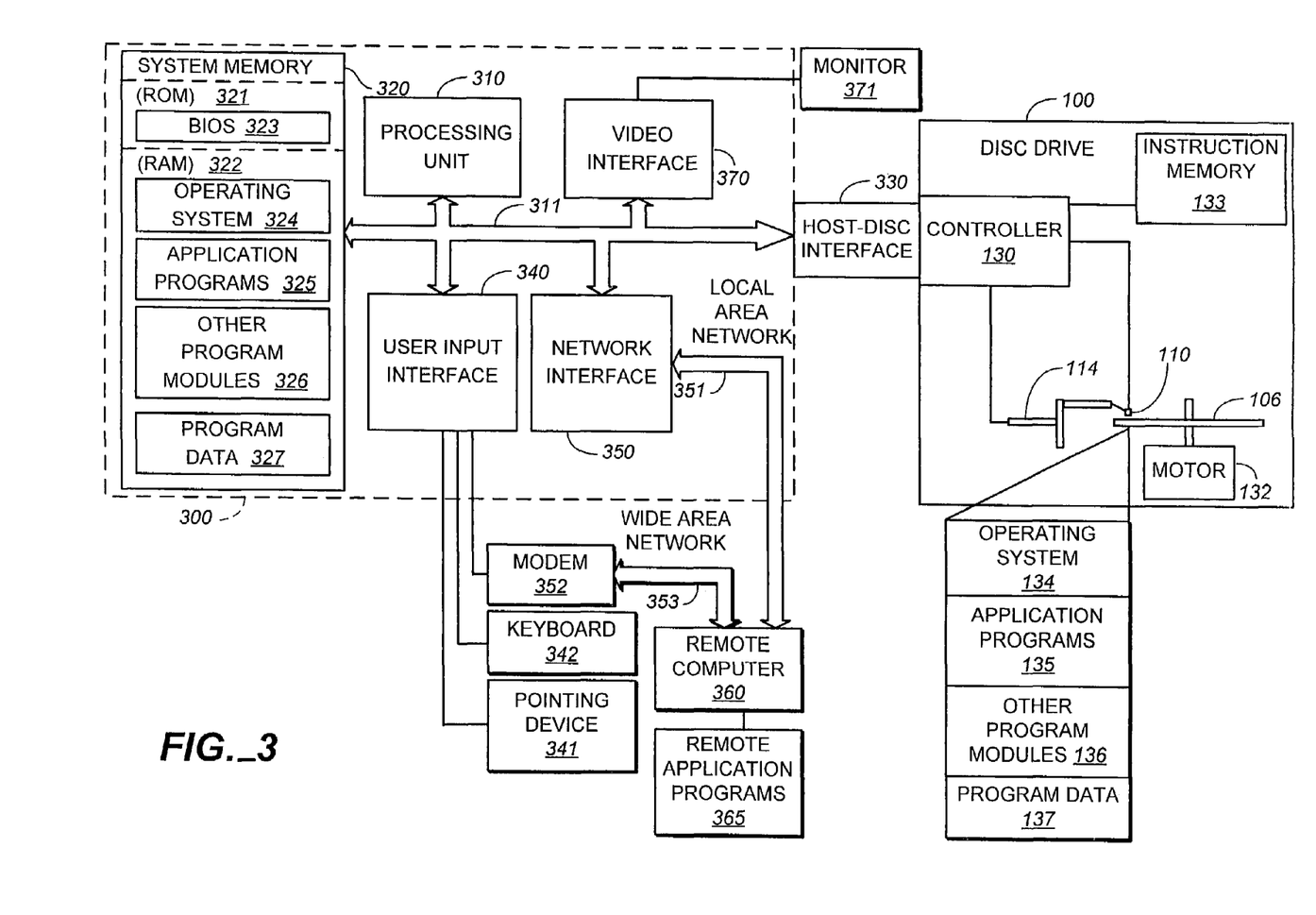
FIG. 3 is a block diagram showing a disc drive of the present invention coupled to a host computer.

In FIG. 3, disc drive 100 is coupled to host computer 300, which is an exemplary general-purpose computing device. Components of computer 300 may include a processing unit 310, a system memory 320, and a system bus 311 that couples various system components including the system memory to the processing unit 310. System bus 311 may be any of several types of bus structures including a memory bus or memory controller, a peripheral bus, and a local bus using any of a variety of bus architectures.

A user may enter commands and information into computer 300 through input devices such as a keyboard 342 and a pointing device 341, such as a mouse, trackball or touch pad. These and other input devices are often connected to the processing unit 310 through a user input interface 340 that is coupled to the system bus. A monitor 371 or other type of display device is also connected to system bus 311 via an interface, such as a video interface 370. Computer 300 may operate in a networked environment using logical connections to one or more remote computers, such as a remote computer 360 on which remote application programs 365 reside. The logical connections depicted in FIG. 3 include a local area network (LAN) 351 and a wide area network (WAN) 353, but may also include other networks. When used in a LAN networking environment, computer 300 is connected to LAN 351 through a network interface or adapter 350. When used in a WAN networking environment, computer 300 typically includes a modem 352 or other means for establishing communications over WAN 353, such as the Internet.

As mentioned above, computer 300 includes system memory 320 that is coupled to processing unit 310 via system bus 311. System memory 320 includes computer storage media in the form of volatile and/or nonvolatile memory such as read only memory (ROM) 321 and random access memory (RAM) 322. A basic input/output system 323 (BIOS), containing the basic routines that help to transfer information between elements within computer 300, such as during start-up, is typically stored in ROM 321. RAM 322 typically contains data and/or program modules that are immediately accessible to and/or presently being operated on by processing unit 310. By way of example, FIG. 3 illustrates operating system 324, application programs 325, other program modules 326, and program data 327.

As can be seen in FIG. 3, disc drive 100 is coupled to computer 300 via host-disc interface 330. Computer 300 transfers data to and reads data from disc drive 100 via host-disc interface 330. Host-disc interface 330 may be any type of data exchange interface for coupling a disc drive to a host computer, such as SCSI (Small Computer System Interface), UDMA (Ultra Direct Memory Access), ATA (Advance Technology Attachment), or other standards as are known in the industry or are developed in the future.

In disc drive 100, data is received from, or provided to, host computer 300 with the help of controller 130, which also implements the data encryption scheme of the present invention. In general, controller 130 carries out its functions by executing instructions contained in instruction memory 133.

Disc drive 100 provides storage of computer readable instructions, data structures, program modules and other data for computer 300. In FIG. 3, for example, disc drive 100 is illustrated as storing operating system 134, application programs 135, other program modules 136, and program data 137. Note that these components can either be the same as or different from operating system 324, application programs 325, other program modules 326, and program data 327. Operating system 134, application programs 135, other program modules 136, and program data 137 are given different numbers here to illustrate that, at a minimum, they are different copies.

Operating system 134, application programs 135, other program modules 136, and program data 137 are stored as files, with each file being stored over a cluster of sectors (or physical memory locations) referenced through LBAs. It should be noted that the organization and structure of files is controlled by the host computer with the help of the operating system. In general, a disc drive controller (such as 130) operates independently of the operating system and is therefore unaware of any LBA-file relationships. In other words, if the host computer (such as 300) sends data corresponding to a file to the disc drive (such as 100), the information reaches the disc controller (such as 130) as data to be stored in an LBA range. In response to receiving the data storage information, the controller (such as 130), with the help of head 110, simply stores the data in physical memory locations that correspond to the specified contiguous LBA range.

In accordance with one embodiment of the present invention, program instructions for LBA range encryption, decryption and other corresponding functions, which controller 130 is capable of executing, are stored in instruction memory 133. Also, an encryption range table that can store at least one predetermined range of LBAs, that correspond to at least a subset (less than all) of the plurality of physical memory locations, is included in non-volatile memory (on a disc surface, for example). Table 1 below is an example of such an encryption range table.

TABLE 1

| Starting LBA | Ending LBA | Encryption and Decryption Information | User Authentication Information |
|---|---|---|---|
| 10 | 15 | . . . | . . . |
| . | . | . | . |
| . | . | . | . |
| . | . | . | . |

As mentioned above, in response to receiving the data storage information, the controller (such as 130) stores the data in physical memory locations that correspond to the specified LBA range. However, in accordance with the present invention, prior to storing the data in the corresponding physical memory locations, controller 130 determines whether or not the specified LBA range at least partially overlaps any predetermined LBA range(s) stored in the encryption range table. Data corresponding to any of the overlapping LBAs is encrypted by controller 130 prior to storage in the corresponding physical memory locations. For example, if a specified LBA range in a write command sent by the host computer is 10-20 and a predetermined LBA range in the encryption range table is 10-15 (starting LBA=10 and ending LBA=15), then data corresponding to LBAs 10-15 is encrypted prior to storage in the physical memory locations corresponding to LBAs 10-15. Data corresponding to LBAs 16-20 is not encrypted. Similarly, if data has to be read from locations physical memory locations corresponding to LBAs 10-20, the encrypted data in physical memory locations corresponding to LBAs 10-15 is decrypted by controller 130 before it is transferred to host computer 300 along with data corresponding to LBAs 16-20. Thus, the present invention provides a substantially host-independent and file-independent encryption scheme, which overcomes the earlier mentioned problems associated with the prior art encryption schemes. It should be noted that, usually, LBA ranges are assigned to coincide with disc partitions and therefore files are either completely encrypted or completely unencrypted. Files may not be split between partitions.

The encryption table(s) (such as Table 1) is created at the time of disc manufacture. Records are added to the encryption table and/or modified after the disc drive (such as 100) is installed in the host computer (such as 300). Additions, deletions and updates of records in the encryption table(s) can be carried out by utilizing any suitable commands that are compatible with host-disc interface protocols, for example.

Figure 4:
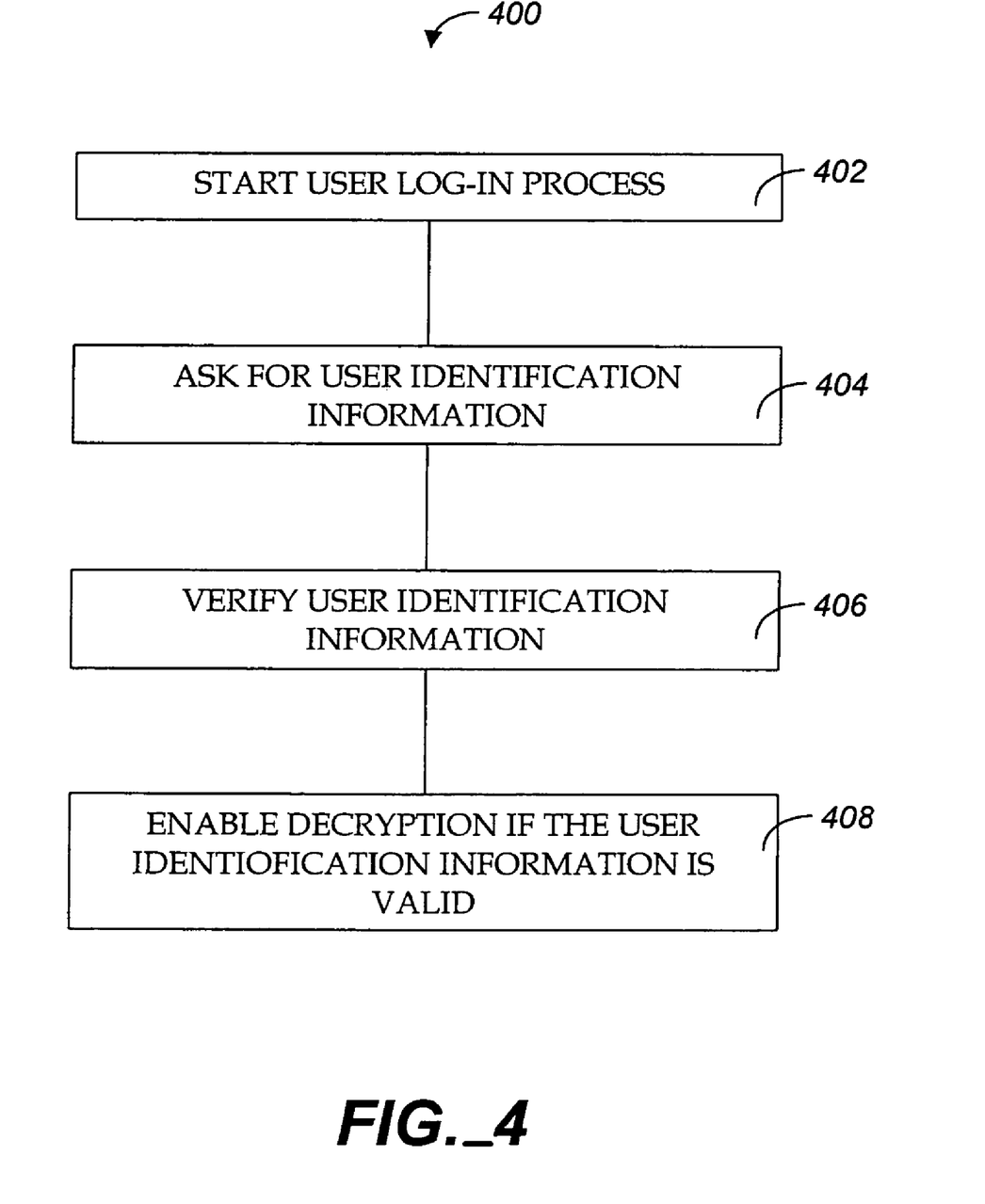
FIG. 4 is a flowchart of an example user authentication procedure in accordance with an embodiment of the present invention.

In some embodiments of the present invention, a user authentication process is carried out to determine whether or not encryption functions for any predetermined range(s) of LBAs are enabled for a current user of the host computer (such as 300). User authentication in connection with the encryption scheme is preferably carried out at the time the user logs in to the host computer (such as 300). FIG. 4 is a flowchart 400 of an example user authentication procedure in accordance with an embodiment of the present invention. In accordance with this procedure, a user log-in process begins at step 402. At step 404, the user is asked to enter identification information (username and password, for example). At step 406, the user identification information is verified. At step 408, decryption is enabled (encrypted data in the disc drive is decrypted for the user to access) if the user identification information is found to be valid. In some embodiments of the present invention, the user identification information includes a decryption key. In other embodiments, entry of the user identification information results in the host computer (such as 300) selecting an appropriate encryption/decryption key that is used to enable decryption. User identification information may be stored in, or tied (joined) to, the encryption range table. In some embodiments, the user authentication procedure is primarily implemented in the operating system. In other embodiments, the user authentication procedure is primarily implemented in BIOS or in a BIOS extension. It should be noted that no operating system changes are required when the user authentication is implemented in the BIOS or BIOS extension. In some embodiments, the user authentication scheme employs security tokens, biometric scanners, etc., which enhance the security of authentication beyond more basic pass phrases.

As mentioned above, contents of the encryption table can be modified (records can be added, deleted and/or updated) by utilizing commands that are compatible with host-disc interface protocols. In embodiments of the present invention, a user authorization process is carried out to determine a level of access 20 (no access, query only, or query and update) that a current user of the host computer (such as 300) has to the encryption range table(s). The user authorization process may be carried out in conjunction with the user authentication process using techniques similar to those described above. User authorization information may be stored in a hidden area of the disc drive and may be loaded into the host computer (such as 300) during the authorization process.

It should be noted that, in accordance with the present invention, encryption capabilities may differ for different models of disc drives. In different embodiments of the present invention, different encryption standards, such as SHA-1 (Secure Hash Standard) based encryption methods, DES (Data Encryption Standard), AES (Advanced Encryption Standard), etc., may be utilized. The encryption keys and other information from the encryption range table are not normally accessible to the host computer. Further, authentication and encryption key management is performed in disc controller 130. In some embodiments, encryption keys associated with records in the encryption table(s) may each be derived from a secret master key. Different ciphers (algorithms used to encrypt data) having different capabilities may be utilized in different embodiments of the present invention. Also different lengths of encryption keys (for example, 64, 128, 192 or 256 bit keys) may be utilized or specified in different embodiments. In some embodiments, for protection of very sensitive data (for example, sensitive data in a laptop being transported) data encryption keys may be exported from the disc drive and destroyed in the disc drive. When the encryption keys are destroyed, no disc inspection can reveal the keys. Here, an attacker needs to steal both the drive and the keys to access the confidential information. In such embodiments, a key download command is necessary to reactivate encrypted data in the disc drive.

Figure 5:
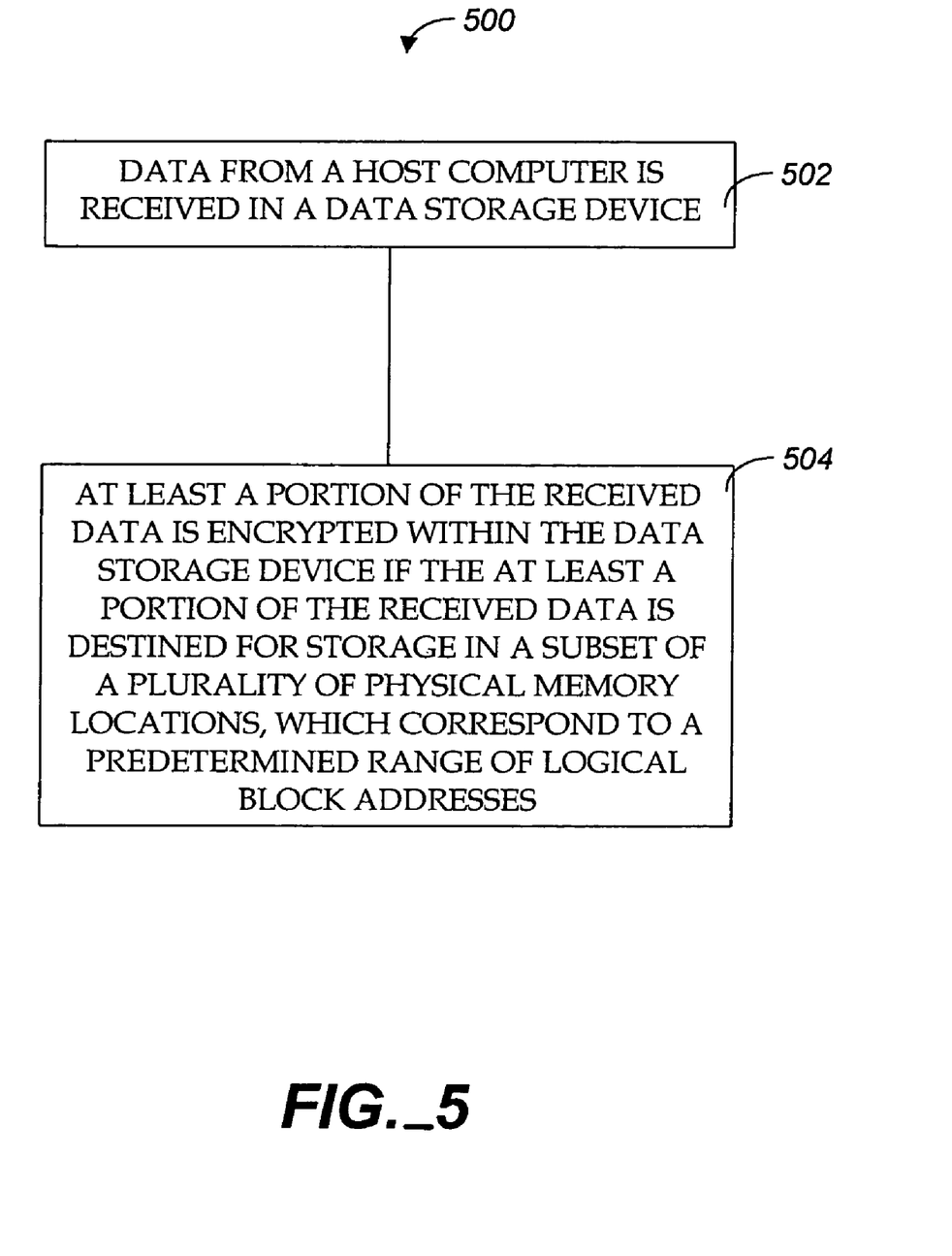
FIG. 5 is a flowchart of a method embodiment of the present invention.

Referring now to FIG. 5, a flowchart 500 representing a method of encrypting information in a data storage device in accordance with an illustrative embodiment of the present invention is shown. The data storage device includes a storage medium having a plurality of physical memory locations referenced through logical block addresses. At step 502, data from a host computer is received in the data storage device. At step 504, at least a portion of the received data is encrypted within the data storage device if the at least a portion of the received data is destined for storage in at least a subset of a plurality of physical memory locations, which correspond to a predetermined range of logical block addresses. The encryption of the at least a portion of the received data is substantially transparent to the host computer and independent of a file to which the data for storage belongs. Different techniques, some of which are set forth above, can be employed to carry out the steps shown in the flowchart of FIG. 4 while maintaining substantially the same functionality without departing from the scope and spirit of the present invention.

Figure 6:
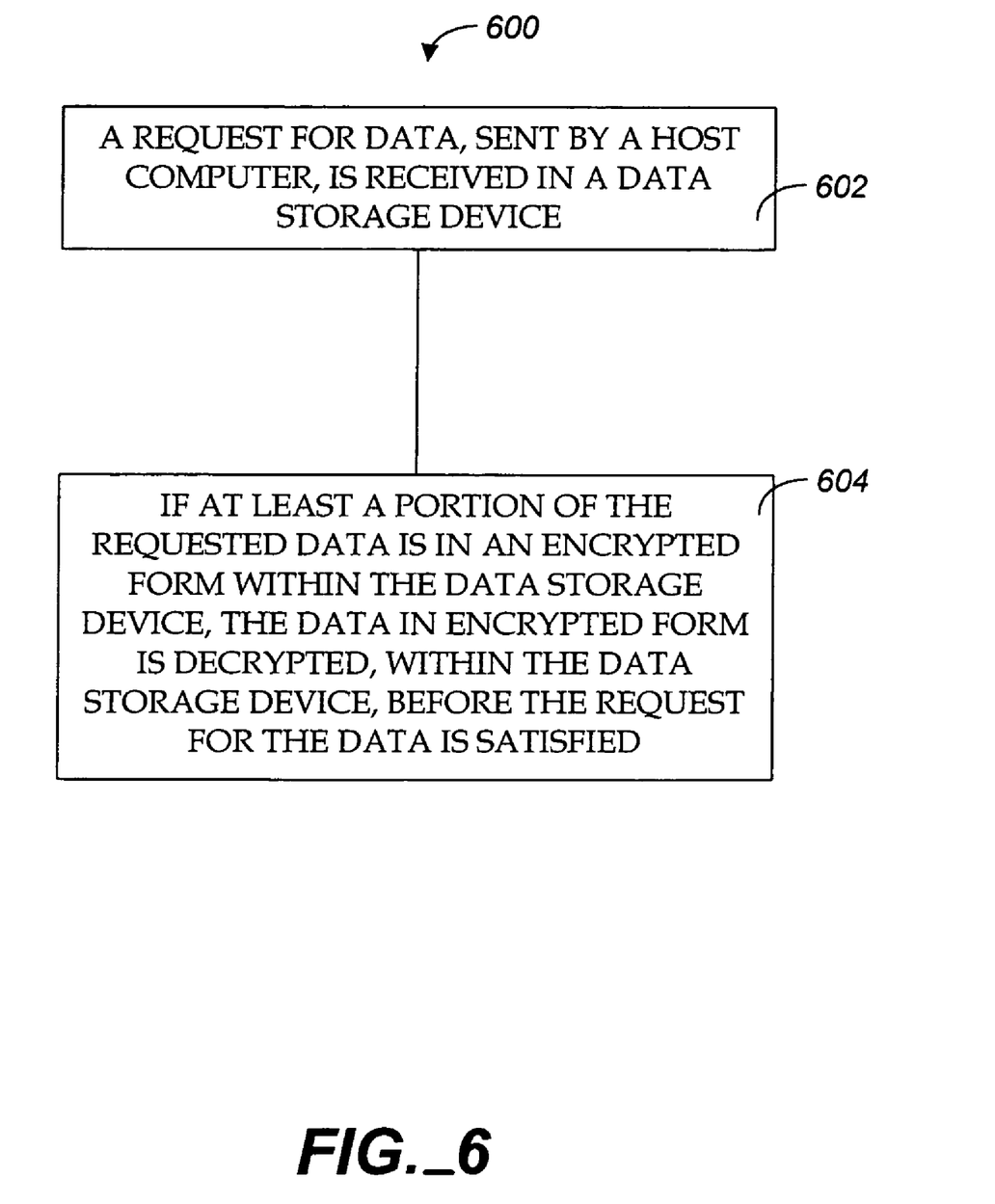
FIG. 6 is a flowchart representing a method of retrieving encrypted information, which is stored in a data storage device.

Referring now to FIG. 6, a flowchart 600 representing a method of retrieving encrypted information, which is stored in a data storage device, is shown. In this embodiment of the present invention, at step 602, a request for data, sent by a host computer, is received in a data storage device. At step 604, if at least a portion of the requested data is in an encrypted form within the data storage device, the data in encrypted form is decrypted, within the data storage device, before the request for the data is satisfied. Of course, the data is decrypted only if the current user of the host computer is properly authenticated as described above in connection with FIG. 4.

In addition to being operational with general purpose computer 300 (FIG. 3), disc drive 100 of the present invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is directed to a data encryption system for a disc drive data storage system, it will be appreciated by those skilled in the art that the teachings of the present invention can be applied to any data storage system in which host-independent and file-independent data encryption is desired, without departing from the scope and spirit of the present invention. Further, the encryption scheme of the present invention may be implemented in hardware and/or software within the data storage device.

What is claimed is:

1. A storage device for use with a host computer, the device comprising:
   a storage medium having a plurality of physical memory locations referenced through logical block addresses; and
   a controller configured to encrypt data for storage in at least a subset of the plurality of physical memory locations, which correspond to a predetermined range of logical block addresses,
   wherein the encryption of data is substantially transparent to the host computer and independent of a file to which the data for storage belongs.

2. The apparatus of claim 1 wherein the predetermined range of logical block addresses is stored in an encryption range table.

3. The apparatus of claim 2 wherein the encryption range table is stored on the storage medium.

4. The apparatus of claim 2 wherein the controller is further configured to carry out a user authorization process, the user authorization process being carried out to determine whether or not the encryption range table can be modified by a current user of the host computer.

5. The apparatus of claim 1 wherein the controller is further configured to carry out a user authentication process prior to carrying out the encryption of the data for storage, the user authentication process being carried out by the controller to determine whether or not encryption functions for the predetermined range of logical block addresses are enabled for a current user of the host computer.

6. The apparatus of claim 5 wherein the predetermined range of logical block addresses and user identification information for the user authentication process are stored in an encryption range table.

7. The apparatus of claim 6 wherein the user authentication process is carried out by a basic input/output system in conjunction with the controller, the basic input/out system utilizes the user identification information from the encryption range table.

8. The apparatus of claim 6 wherein the user authentication process is carried out by a basic input/output system extension in conjunction with the controller, the basic input/output system extension utilizes the user identification information from the encryption range table.

9. The apparatus of claim 6 wherein the user authentication process is carried out by an operating system in conjunction with the controller, the operating system utilizes the user identification information from the encryption range table.

10. The apparatus of claim 1 wherein the controller is further configured to decrypt stored encrypted data, wherein the decryption of data is substantially transparent to the host computer.

11. A method of encrypting information in a data storage device that includes a storage medium having a plurality of physical memory locations referenced through logical block addresses, the method comprising:
    (a) receiving, in the data storage device, data from a host computer; and
    (b) encrypting at least a portion of the received data, within the data storage device, if the at least a portion of the received data is destined for storage in at least a subset of the plurality of physical memory locations, which correspond to a predetermined range of logical block addresses,
    wherein the encryption of the at least a portion of the received data is substantially transparent to the host computer and independent of a file to which the data for storage belongs.

12. The method of claim 11 wherein the predetermined range of logical block addresses is stored in an encryption range table.

13. The method of claim 12 further comprising carrying out a user authorization process, the user authorization process being carried out to determine whether or not the encryption range table can be modified by a current user of the host computer.

14. The method of claim 11 wherein the encryption range table is stored on the storage medium.

15. The method of claim 11 further comprising carrying out a user authentication process prior to carrying out the encryption step (a), the user authentication process being carried out to determine whether or not encryption functions for the predetermined range of logical block addresses are enabled for a current user of the host computer.

16. The method of claim 15 wherein the predetermined range of logical block addresses and user identification information for the user authentication process are stored in an encryption range table.

17. The method of claim 16 wherein the user authentication process is carried out by a basic input/output system, which utilizes the user identification information from the encryption range table.

18. The method of claim 16 wherein the user authentication process is carried out by a basic input/output system extension, which utilizes the user identification information from the encryption range table.

19. The method of claim 16 wherein the user authentication process is carried out by an operating system, which utilizes the user identification information from the encryption range table.

20. A data storage device for use with a host computer, the device comprising:
 a storage medium having a plurality of physical memory locations referenced through logical block addresses; and
 means for encrypting data for storage in at least a subset of the plurality of physical memory locations, which correspond to a predetermined range of logical block addresses,
 wherein the encryption of data is substantially transparent to the host computer.

* * * * *